(12) United States Patent
Hodko (10) Patent No.: US 6,203,682 B1
(45) Date of Patent: Mar. 20, 2001

(54) WELL DESIGNS FOR ELECTROKINETIC REMEDIATION

(75) Inventor: Dolibor Hodko, College Station, TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 09/139,991

(22) Filed: Aug. 25, 1998

(51) Int. Cl.$^7$ ........................................ C25C 1/22
(52) U.S. Cl. ........................ 204/515; 205/687; 205/688; 205/766; 588/204
(58) Field of Search .................. 205/687, 688, 205/766; 204/515; 588/204

(56) References Cited

U.S. PATENT DOCUMENTS

| | | |
|---|---|---|
| 2,831,804 | 4/1958 | Collopy . |
| 3,782,465 | 1/1974 | Bell . |
| 4,367,132 | 1/1983 | Bell . |
| 4,382,341 | 5/1983 | Bell . |
| 4,453,594 | 6/1984 | Patten . |
| 4,479,857 | 10/1984 | Barton . |
| 4,495,990 | 1/1985 | Titus . |
| 5,074,986 | 12/1991 | Probstein . |
| 5,137,608 | 8/1992 | Acar . |
| 5,398,756 | 3/1995 | Brodsky . |
| 5,405,509 | 4/1995 | Lomasney . |
| 5,416,257 | 5/1995 | Peters . |
| 5,435,895 | 7/1995 | Lindgren . |
| 5,458,747 | 10/1995 | Marks . |
| 5,476,992 | 12/1995 | Ho . |
| 5,489,370 | 2/1996 | Lomasney . |
| 5,584,980 | * 12/1996 | Griffith et al. ................ 204/516 |
| 5,616,235 | 4/1997 | Acar . |
| 5,725,752 | * 3/1998 | Sunderland et al. ............ 205/687 |

FOREIGN PATENT DOCUMENTS

| | | |
|---|---|---|
| 88202274 | 10/1988 | (EP) . |
| 88202274 | 1/1991 | (NL) . |

* cited by examiner

*Primary Examiner*—Arun S. Phasge
(74) *Attorney, Agent, or Firm*—Streets & Steele; Jeffrey L. Streets (57) ABSTRACT

The invention provides an apparatus for electrokinetic transport through soil, comprising an electrode and a containment surrounding the electrode, the containment comprising a layer of a porous material and a rigid porous member disposed between the electrode and the porous material to support or secure the first material. The porous material and rigid porous member allow passage of water, hydrogen ions, hydroxyl ions and one or more target ions. A preferred porous material is clay or ceramic and a preferred rigid porous member is a perforated plastic tube.

6 Claims, 7 Drawing Sheets

Direction of Electroosmosis →

WELL DESIGNS FOR ELECTROKINETIC REMEDIATION

This invention was made with Government support under contact DACA39-93-C-0150 awarded by the United States Department of Defense (Army). The Government has certain rights in this invention.

BACKGROUND OF THE INVENTION

Electrokinetic phenomena include electromigration, electroosmosis, and electrophoresis. Electroosmosis is defined as the mass flux of a fluid containing ions through a stationary porous medium caused by the application of an electrical potential. The fluid moves through the voids in the porous medium (e.g. soil) called pores. Each pore has a thin layer of charged fluid next to the pore wall having a typical thickness of between about 1 and about 10 nanometers. The thin layer of charged fluid next to the pore wall is present to neutralize the charge on the surface of the soil particle that forms the pore wall. Fluid movement occurs in soil pores because of the charge interaction between the bulk of the liquid in the pore and the thin layer of charged fluid next to the pore wall. Under the influence of a DC electric field, the thin layer of charged fluid moves in a direction parallel to the electric field. Large amounts of liquid may be transported along with the thin layer of charged fluid as well as contaminants or other species contained within the liquid.

Electromigration is defined as the mass flux of a charged ionic or polar species within a liquid or solution from one electrode to another electrode. Electromigration and electroosmosis may occur simultaneously and are the dominant mechanisms through which conventional electrokinetic transport processes occur.

Electroosmosis has been used as a method for dewatering soils and sludges. The fundamentals of this method were established through the work of Cassagrande and Grey. During the 1970's, electrokinetic metal recovery was used as a method for mining metals, such as copper. These processes involved insertion of electrodes into the ground. The electrodes are enclosed within porous enclosures or wells. These enclosures are filled with an electrolyte, typically an acid.

One recent application in which electrokinetic transport of materials has found practical use is the electrokinetic remediation of contaminants in soil. Electrokinetic remediation, frequently referred to as either electrokinetic soil processing, electromigration, electrochemical decontamination or electroreclamation, uses electrical currents applied across electrode pairs placed in the ground to extract radionuclides, heavy metals, certain organic compounds, or mixed inorganic species and organic wastes from soils and slurries. The contaminants in a liquid phase in the soil are moved under the action of the electrical field to wells where they are then pumped out.

During electrokinetic processing, water in the immediate vicinity of the electrodes is electrolyzed to produce H+ ions at the anode and OH− ions at the cathode, causing the pH of the soil to change, according to the following equations.

Anode Reaction $$2H_2O \rightarrow O_2 + 4e^- + 4H^+ \qquad \text{Equation (1)}$$

Cathode Reaction $$2H_2O + 2e^- \rightarrow H_2 + 2OH^- \qquad \text{Equation (2)}$$

If the ions produced are not removed or neutralized, these reactions lower the pH at the anode and raise the pH at the cathode. Protons formed at the anode migrate towards the cathode and can aid contaminant removal by increasing metal extraction. In contrast, the hydroxyl ions formed at the cathode do not migrate as efficiently as protons and can increase the soil pH in the cathode region, as high as a pH of 12, and cause deposition of insoluble species, thereby forming regions of high electrical resistivity. These pH changes can have a significant effect on the soil zeta potential as well as solubility, ionic state and charge, and the level or adsorption of the contaminants. It is, therefore, desirable to monitor and control the pH of the fluids in the vicinity of the electrodes as well as the fluid transported from the anode to the cathode.

In areas with highly porous mediums, such as sand, it is difficult to stop the downward drainage of fluids including contaminants. It is therefore desirable to control the flow of fluids through highly porous mediums and overcome the gravity induced downward drainage of the fluids.

The voltage drop across the well wall and the soil effects the rate of electroosmotic flow depending on the type of soil being remediated. It would be useful if the voltage drop across the soil and the well wall could be controlled so as to maximize electroosmotic flow through a porous medium.

There is a central dilemma regarding the make up of well walls for the electrodes. For efficient electrokinetic processing, the well walls must be highly permeable to fluids and to ions. However, to prevent downward drainage, the well must be highly impermeable to fluids. Ideally, the well wall should provide "fluid rectification", meaning the well wall does not prevent electrokinetic processes (either electrokinetically driven ion migration or the flow of fluid occurring by electroosmosis) and inhibits the movement of fluid by other means.

Electroosmosis is a very important phenomenon that can be harnessed for fluid removal from soil or for the introduction of fluids into the soil. However, there are difficulties with electroosmosis, in particular, certain soil conditions do not support electroosmosis, such as soil with relatively high hydraulic permeability (i.e., relatively loosely packed sandy soils). Electroosmosis is most effective in fine-grained soils with pore sizes of about a micrometer or smaller, such as clayey or silty soils. With sandy soils, gravitational flow and downward drainage are usually the dominant fluid flow processes. It is therefore desirable in certain circumstances to design electrode well walls that inhibit downward drainage and promote electroosmosis in loosely packed soils.

SUMMARY OF THE INVENTION

The present invention generally provides layered arrangements of materials to form electrode well walls to enhance electrokinetic remediation. In particular, the well walls can be double or multi-layer porous structures. Each layer in the well wall has a different hydraulic permeability coefficient (kh) and electroosmotic permeability coefficient (ke) from the adjacent layer or layers. The outermost layer, closest to the soil, typically has a distinctly different ke and kh than does the surrounding soil. The well wall structures can be used alone or can be combined with other electrodes in an array in what is referred to as coupled porous structures. A "coupled porous structure" means the coupling of the functionality of the soil to be treated (as defined by its hydraulic, electroosmotic, and electrical conductivity properties) to the functionality of the well wall (as defined by its hydraulic, electroosmotic, and electrical conductivity properties). Coupling of different functionalities of one or more wells is used to accomplish efficient electrokinetic remediation of a particular site. These well wall structures are particularly useful for electrokinetic remediation in high hydraulic permeability soils which are typically difficult to treat because of low electroosmotic flow and high fluid drainage.

Specifically, the invention provides an apparatus for electrokinetic transport through soil, comprising an electrode and a containment surrounding the electrode, the containment comprising a layer of a porous material and a rigid porous member disposed between the electrode and the porous material to support or secure the first material. The porous material and rigid porous member allow passage of water, hydrogen ions, hydroxyl ions and one or more target ions. A preferred porous material is clay or ceramic and a preferred rigid porous member is a perforated plastic tube.

BRIEF DESCRIPTION OF THE DRAWINGS

So that the above recited features, advantages and objects of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention generally provides layered arrangements of materials to form electrode well walls to enhance electrokinetic remediation. In particular, the well walls can be double or multi-layer porous structures. Each layer in the well wall has a different hydraulic permeability coefficient (kh) and electroosmotic permeability coefficient (ke) from the adjacent layer or layers. The outermost layer, closest to the soil, typically has a distinctly different ke and kh than does the surrounding soil. The well wall structures can be used alone or can be combined with other electrodes in an array in what is referred to as coupled porous structures. A "coupled porous structure" means the coupling of the functionality of the soil to be treated (as defined by its hydraulic, electroosmotic, and electrical conductivity properties) to the functionality of the well wall (as defined by its hydraulic, electroosmotic, and electrical conductivity). Coupling of different functionalities of one or more wells is used to accomplish efficient electrokinetic remediation of a particular site. These well wall structures are particularly useful for electrokinetic remediation in high hydraulic permeability soils which are typically difficult to treat because of low electroosmotic flow and high fluid drainage.

Ideal soil conditions for electroosmosis have a hydraulic permeability coefficient (kh) of about $10^{-8}$ cm/s and an electroosmotic permeability coefficient (ke) of about $10^{-5}$ cm$^2$/vs. The following table summarizes the hydraulic permeability and electroosmotic permeability ranges for different types of soils that may be subjected to electrokinetic remediation.

| Soil Type | Hydraulic Permeability (cm/s) | Electroosmotic Permeability (cm$^2$/Vs) |
| --- | --- | --- |
| sand | $10^{-1}$ to $10^{-3}$ | $10^{-8}$ to $10^{-9}$ |
| clay | $10^{-5}$ to $10^{-8}$ | $10^{-4}$ to $10^{-6}$ |
| loosely packed sandy/silty | $10^{-3}$ to $10^{-5}$ | $10^{-6}$ to $10^{-8}$ |

The well wall structures referred to herein are made of materials having various ke and kh coefficients. The following table illustrates some examples of materials used to construct electrode well walls and their respective kh and ke coefficients.

| Material | Hydraulic Permeability | Electroosmotic Permeability |
| --- | --- | --- |
| sand | $10^{-1}$ to $10^{-3}$ | $10^{-8}$ to $10^{-9}$ |
| clay | $10^{-5}$ to $10^{-8}$ | $10^{-4}$ to $10^{-6}$ |
| clay/sand mixture (80/20) | $10^{-5}$ to $10^{-7}$ | $10^{-6}$ to $10^{-7}$ |
| PVC pipe with holes (0.7–1 cm diameter) | >0.1 cm/s | |
| ceramic | | |
| polyethylene filter | >0.1 cm/s | |

Figure 1:
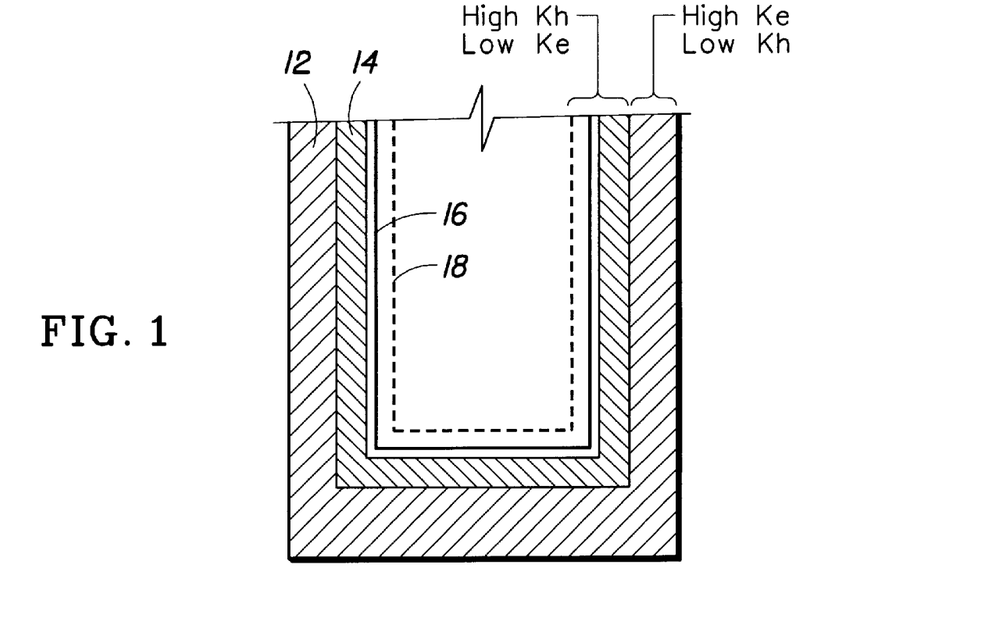
FIG. 1 is a schematic drawing of one well wall design of the present invention.

FIG. 1 is a schematic view of an electrode well that can be used in a coupled porous structure for an anode. The well structure shown is useful in sandy and/or loosely packed soil having high kh and low ke properties because the well wall promotes electroosmosis through the soil. The outer layer 12 of the well wall is made of a layer of low kh and high ke material such 10 as clay i.e., kaolin or bentonite. Inside the clay-type layer 12 there are three low ke high kh layers. Immediately adjacent to the clay type layer 12 is a sand layer 14 consisting of course granules that act as a filter to keep clay particles away from the interior of the well because clay particles have a strong tendency to migrate towards the anode. Adjacent to the sand layer 14 there is a polymer film or filter layer 16 which is freely permeable to fluids and keeps the sand particles from flowing into the well. Adjacent to the polymer filter layer 16 is a pipe layer 18 with holes extending through the walls of the pipe 18 making the pipe freely permeable to fluids. A suitable pipe material is polyvinylchloride.

Figure 2:
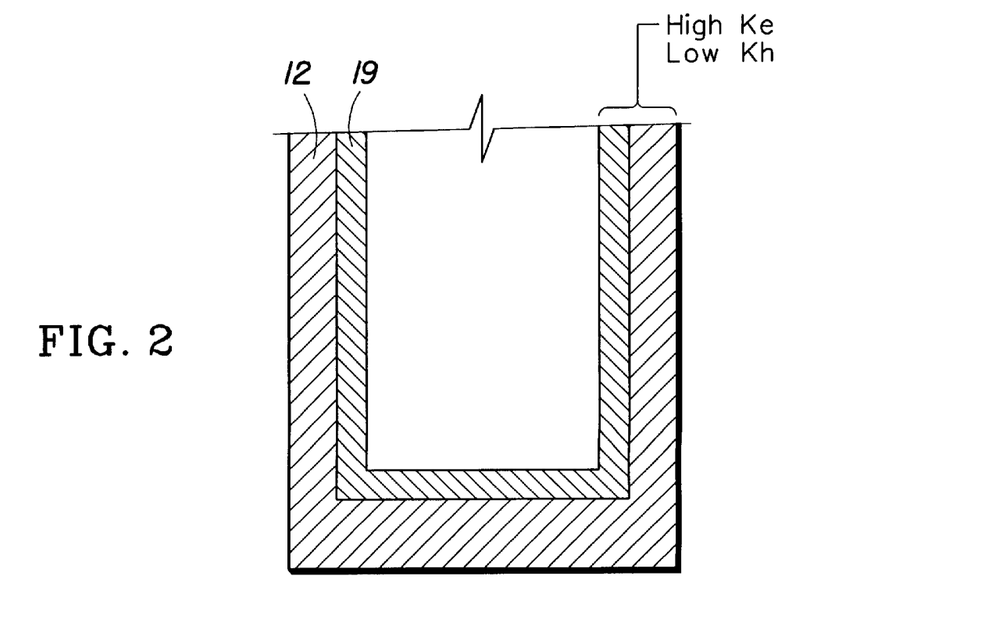
FIG. 2 is a schematic drawing of one well wall design of the present invention.

FIG. 2 is a schematic of an electrode well wall containing a high ke low kh layer, such as a clay layer 12 surrounding a ceramic layer 19. This type of well wall can be coupled with soil having high kh and low ke properties such as sand. A low kh layer in the well wall is desirable because it prevents or minimizes fluid losses due to downward drainage from the well, which would otherwise occur rapidly in a high kh, low ke soil. Fluid is therefore retained around the electrodes. However, when a current is applied across the soil, fluid is transported through the well walls via electroosmotic flow because the well wall has a high ke. One desirable feature of the well design is that fluid flow through the wall occurs only when an electrical current is applied and fluid flow by non-electrical forces occurs slowly if at all. Moreover, fluid flows out of or into the wells in a direction dictated by the placement of the electrodes which promotes horizontal fluid transport and counteracts the tendency of fluid to drain in a downward direction. Since the ke of the wall layer is significantly higher than the sandy soil, the rate of electroosmotic fluid flow will be driven by the high ke layer. The well wall design in FIG. 2 may be used for either an anode or a cathode.

The well design in FIG. 2 may also be used in clay type soils. Soil with low hydraulic permeability can be highly permeable to water due to channeling which is caused by structural heterogeneities in the soil. It is therefore desirable to use a low hydraulic permeability and high electroosmotic permeability layer surrounding the anode and/or cathode wells.

EXAMPLE 1

Figure 3:
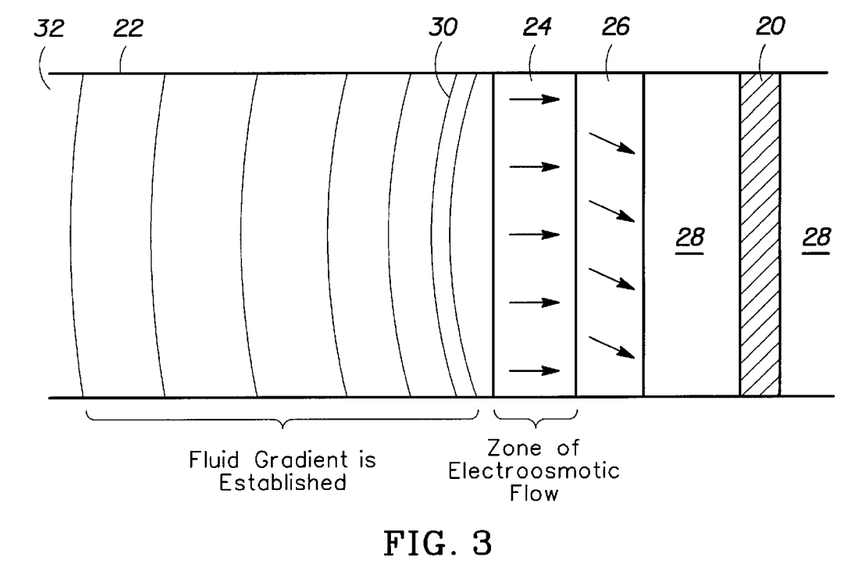
FIG. 3 is a schematic drawing of one well wall design of the present invention in combination with a surrounding soil region.

The following well wall was designed for soils that do not support electroosmosis. These types of soil include high hydraulic permeability (high kh) soils i.e., sandy, or the soils having charge properties that cause it not to support fluid movement by electroosmotic flow. The electrode 20 shown in FIG. 3 is a cathode which is housed in a porous structure 24 and a porous structure 26, where the porous structure 24 comprises a material that has a high ke and a low kh, such as a clay like material. The low ke, high kh material 26 is perforated PVC pipe with holes or slots which allow easy penetration of water into or out of the well. The holes need to be large (high kh), because they provide high throwing power for current flow (low voltage drop) through the holes. Consequently, this material has very high kh. In fact, with such high kh, it is typically not possible to measure the ke in such materials. In addition, polyethylene filt can be a part of the high kh material 26, which serves to prevent soil or sand particles from entering the well through the holes in the PVC casing.

The clay particles of the soil are typically negatively charged. In this example, the electrode 20 is a cathode, surrounded by a fluid region 28. When current was applied between the electrode 20 and an opposing electrode (not shown, but to the left of the page), electroosmotic flow was generated through the well wall 24 toward the electrode 20. The unidirectional electroosmotic flow, although occurring only in the well wall 24, caused fluid to be depleted in the vicinity of the well on its outside surface 30. Thus, a fluid flow gradient was created around the well. The soil fluid and the contents of the soil fluid were then drawn, in part by passive non-electrical processes, toward the fluid depleted zones around the electrode well from the outlying region 32. The soil fluid was then collected in fluid region 28. Therefore, electroosmotic flow to the well wall created fluid pressure changes in the soil that drew the fluid in the direction of the electrode 20. Using this well design, fluid may be drawn into the fluid region 28 over large distances. Fluid contained in the well is not lost due to downward drainage because the high ke and low kh layer 24 in the well wall.

EXAMPLE 2

Experiments were performed using an open bottom soil bed, thirty inches long, five inches wide, and fifteen inches deep. Sandy/silty soil was packed in the soil bed. In test cell number 1, both anode and cathode wells consisted of high kh low ke materials. These wells were composed of the PVC tube perforated by numerous holes having large diameter of approximately 4 millimeters providing a high hydraulic permeability. The high hydraulic permeability layer assured high "throwing power" through the well walls. A large amount of openings in the well wall allow for lower voltage and high current to be applied through the coupled porous structure. The PVC casing was also wrapped in a polyethylene filter.

In test cell number 2 the cathode wells consisted of two high kh low ke layers consisting of perforated PVC tube and a polyethylene filter. The anode well consisted of the same high kh low ke layers as in test cell #1 but the outer layer was formed from a high ke low kh layer consisting of a 1 cm thick layer of kaolinite, an alumina silicate based clay material.

Tap water was added to the soil bed in both the anode and cathode wells with no electricity applied to the system. Water was distributed through the soil bed by diffusion and capillary forces as well as by gravitation to a point of saturation. After gravitational flow was established in all the bottom outlets in the soil bed, an electric field was applied between the electrode wells. The water level in the anode well was maintained as needed using a tap water supply tank with a Mariotte tube inserted for level control. Because water was being pumped into the cathode, there was no need to supply water to the cathode.

TABLE 1

Water balance in the electrokinetic cell with an open bottom and with removal of the electroosmotically transported water from the cathode well.

| Water Consumption | Total Water Collected at | Electroosmotic flow/Total Outlet Flow | Electroosmotic flow/Gravitational |
|---|---|---|---|

| Description | Anode [ml · h⁻¹] | Cathode [ml · h⁻¹] | Total [ml · h⁻¹] | Effluent [ml · h⁻¹] | the Bottom [ml · h⁻¹] | from Cell [%] | Flow [%] |
|---|---|---|---|---|---|---|---|
| No voltage | 180 | 210 | 390 | 0 | 408 | | |
| Electrokinetics | 340 | 0 | 340 | 120 | 206 | 37 | 58 |
| Change [%] | 89 | −100 | −13 | 100 | −50 | | |

TABLE 2

Same as Table 1 except that a kaolinite layer was packed around the anode well.

| | Water Consumption | | | | Total Water Collected at | Electroosmotic flow/Total Outlet Flow | Electroosmotic flow/Gravitational |
|---|---|---|---|---|---|---|---|
| Description | Anode [ml · h⁻¹] | Cathode [ml · h⁻¹] | Total [ml · h⁻¹] | Effluent [ml · h⁻¹] | the Bottom [ml · h⁻¹] | from Cell [%] | Flow [%] |
| No voltage | 20 | 40 | 60 | 0 | 66 | | |
| Electrokinetics | 120 | 0 | 120 | 78 | 152 | 34 | 51 |
| Change [%] | 500 | −100 | 100 | 100 | 130 | | |

Tables 1 and 2 show water balance in the soil during identical experiments using both test cells. The water was transported by electroomosis through the soil to the cathode well and was collected as the effluent. The voltage applied corresponded to conditions lower than the threshold voltage. It was found that a certain threshold voltage has to be applied between the anode and the cathode to obtain effluent in the cathode well, i.e., electroosmotically transported water toward the cathode. To obtain measurable amount of liquid transported through the soil relatively high voltage has to be applied through a low hydraulic permeability soil. The higher the voltage, the higher the electroosmotic flow is obtained. The amount of water transported by electroosmosis will depend on the soil porosity, soil surface charge, the electrode well construction. The total voltage applied between the anode and cathode is comprised of the voltage applied across the electrode well walls and the voltage through the soil. If the voltage drop at the well walls is too high compared to soil voltage, the majority of the voltage is applied across the well walls and not in the soil. In these conditions little electroosmotic flow will occur in the soil. Thus, to obtain the electroosmotic flow through the soil, a "threshold voltage" has to be applied in the soil. The voltage applied in the experiments described in Tables 1 and 2 was above the threshold voltage for the electroosmotic flow (about 80–100 V for these conditions).

The electroosmotic flow was approximately 50–60% of the gravitational flow in both experiments. The amount of water collected at the bottom of test cell 1 decreased by about 50% after the application of the electrical field. This decrease occurred because of horizontal electroosmotic water transport between the electrodes. However, in test cell 2, the volume of water or the flow rate collected at the bottom of the cell increased by about 130% after the application of the electric field. As shown in Table 2 this was a consequence of a six fold increase in the water consumption in the anode well. The increased flow rate from the anode well into the soil was due to the increase electroosmotic flow through the kaolinite layer packed around the anode well. Thus, the water was pumped much faster into the soil at the anode side compared to the electroosmotic pumping and withdrawal of water by the cathode well.

Parallel experiments were conducted in cells where the cathode had an additional clay (kaolinite) layer and the anode had a single high kh low ke layer. When the clay layer was packed around the cathode well, the water was withdrawn from the soil faster than was supplied from the anode well and an overall drying of the soil occurred. In addition, the downward loss of pore fluid was also minimized.

In the above example, the soil fluid pore pressure changes were measured. The pore pressure indicates the moisture content of the soil pores, where electroosmotic flow takes place. Pressure sensors were positioned in the vicinity of the anode well, in the middle of the soil bed and in the vicinity of cathode well, respectively. Air tight connections between the pressure sensors and glass tubes were made, and the glass tubes were replaced in the soil three inches below the soil surface. The pressure sensors were calibrated and a linear response between the pressure (cm water) and sensor voltage was obtained (0.3 cm/V). The pressure sensors indicated a temporary (and spatial) change in the pressure compared to the start of the experiment at a specific location in the soil.

Figure 4:
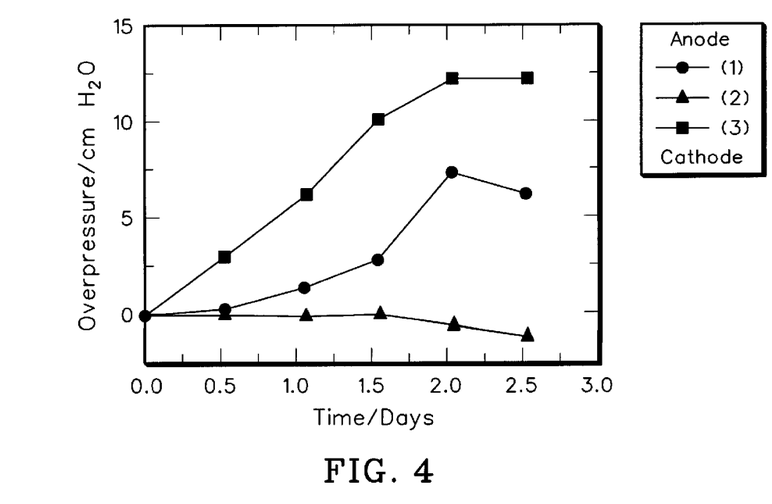
FIG. 4 is a graph of soil pore pressure over time.
Figure 5:
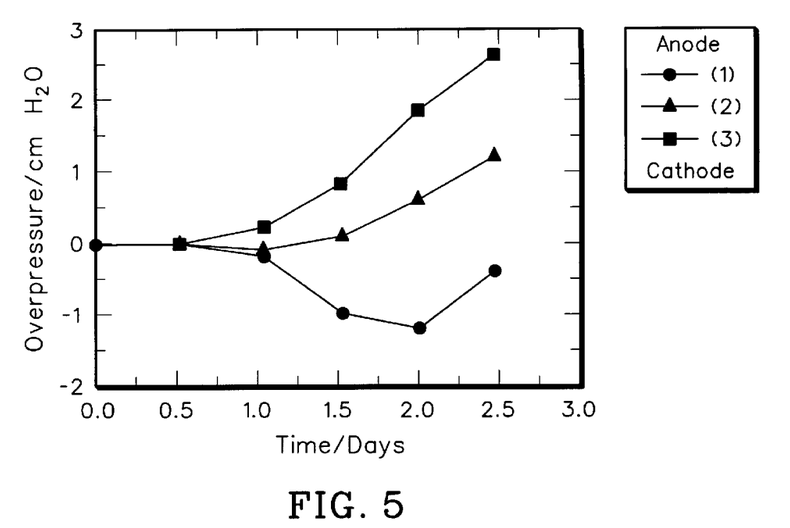
FIG. 5 is a graph of soil pore pressure over time.

FIGS. 4 and 5 show variations in the soil pore pressure throughout the soil during the electrokinetic process in cell 1 and cell 2. As expected, the soil pore pressure in both cases increased toward the cathode due to the water drag by electroosmosis toward the cathode. In the case where the anode well was surrounded by a clay layer, the pressure in the vicinity of the anode slightly decreased with time. Thus, low pore pressure (high suction potential) was established in the clay layer due to a faster electroosmotic flow rate through the clay layer and low moisture content compared to the surrounding more permeable sandy soil. High pressure was established in the middle of the soil (see FIG. 5, curve 2) and indicates stronger electroosmotic pumping through the entire soil area compared to the cell with no clay around anode well (see FIG. 4, curve 2).

EXAMPLE 3

(hypothetical)

An electrokinetic system was assembled for remediation of soil having low ke and hgh kh using electrodes with well walls having at least one high ke low kh layer. Current was applied between the electrodes and the electroosmotic flow across the well wall was monitored. Based on whether the electroosmotic flow is high, low, increasing, or decreasing, specific chemical additions, such as EDTA and citric acid, are made to provide an optimized environment for electroosmotic flow through the well structure. The voltage drop across the well wall was measured using voltage probes. Based on whether the voltage drop across the well wall is high, low, increasing or decreasing, specific chemical additions are made to provide the optimized environment for flow through the well structure. The voltage between the electrodes can be adjusted to effect changes in the rate of electroosmotic flow through the well wall. Monitoring the process by electroosmotic flow measurements or by voltage measurements can be carried out separately or concurrently. Chemical adjustments and voltage adjustments can also be carried out separately or concurrently.

EXAMPLE 4

A rectangular, open top, electrokinetic cell thirty inches long, five inches wide, and fifteen inches deep was filled with soil for some experiments and water for others. One anode well and one cathode well were placed at opposite ends of the cell. Well walls having a high kh and a low ke layers were used. The anode and cathode wells consisted of a 3.75 inch diameter porous ceramic pipe that was 17 inches long and made of high alumina ceramic material formulated to provide a close pore size with high flexural strength and low electrical resistivity. The anode and cathode wells had a wall thickness of 0.4 inches and a 35% (volume) porosity, 0.2–0.5 micron pore size, bulk density of 0.083 lb./in$^3$ and specific resistivity (approximately 40 ohms/cm$^2$/ml thickness (and 0.1 N KCl)). The anode and cathode wells were closed off at the bottom and filled with tap water.

In some of the experiments, the region between the electrode wells was filled with tap water having a pH of approximately 8.2. Water in the cell as a soil medium, was used as a high hydraulic permeability medium that does not support electrokinetic processes, such that electrical transport is determined solely by electromigration. In other experiments, the regions between the electrode wells were filled with silica sand. Fully saturated conditions were established in each experiment. Fluid volume changes in the wells were measured and water conductivity of each porous medium was measured with a laboratory conductivity meter.

Stainless steel voltage probes were positioned inside the ceramic cathode wall (V1), outside the cathode ceramic wall (V2), at the outside of the anode ceramic wall (V3) and inside the anode ceramic wall. The anode (Va) and cathode voltages (Vc) were measured by contacting the electrodes. Voltage differences recorded were: Va–V1, V1–V2, V2–V3, V3–V4 and V4–Vc. These voltages provided the measurements of the following voltage drops or resistances (when constant voltage operation was used and voltages divided by the measured current): Va–V1=voltage drop due to electrode reaction resistance and resistance of the catholyte; V1–V2= voltage drop across the anode ceramics; V2–V3=voltage drop across the soil (or water as a pore fluid); V3–V4= voltage drop across the cathode ceramics, and V4–Vc= voltage drop due to cathode reaction resistance and resistance of the catholyte. It was found that the voltage drops due to electrode reactions and electrolyte resistance in the wells (Va–V1 and V4–Vc) were negligible compared to the rest of the voltage drops in the coupled porous structure and are not shown in the experimental data.

Figure 6:
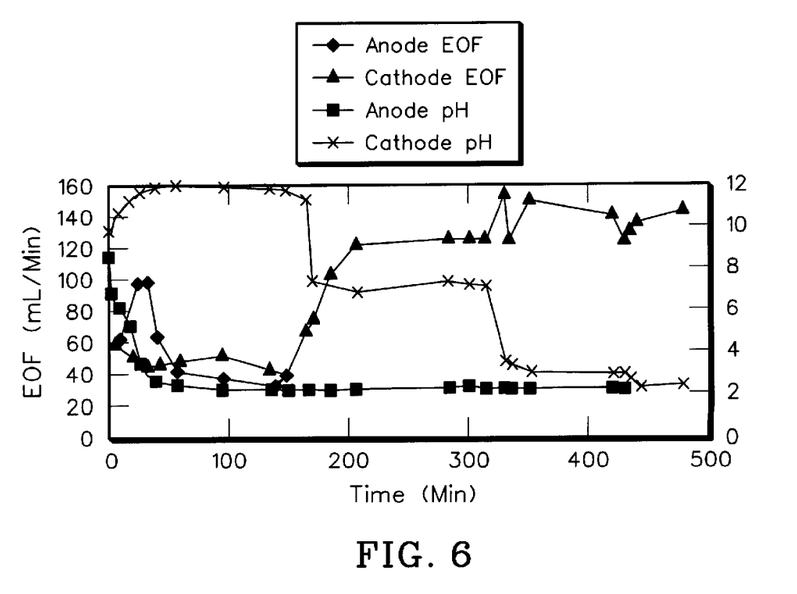
FIG. 6 is a graph of the anode and cathode electroosmotic flow rates as it relates to the pH of the cathode well solution over time.
Figure 6A:
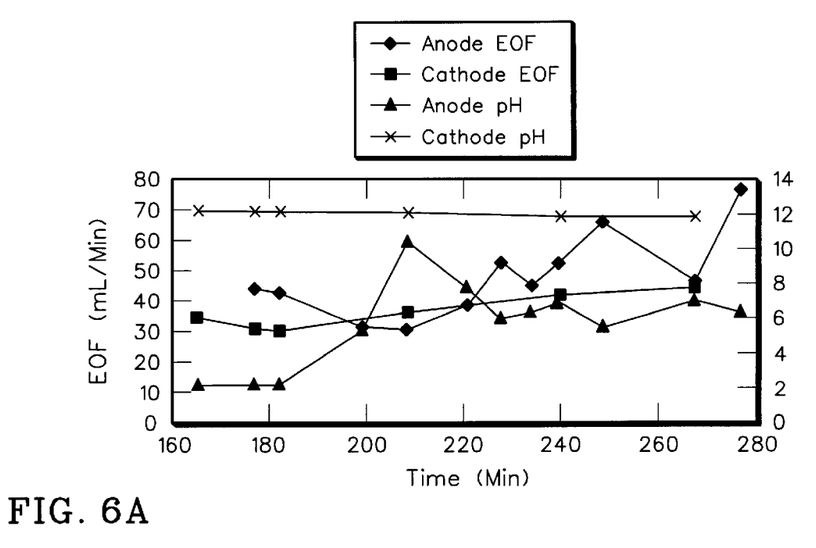
FIG. 6a is a graph of the anode and cathode electroosmotic flow rates as it relates to the pH of the anode well solution over time.
Figure 7:
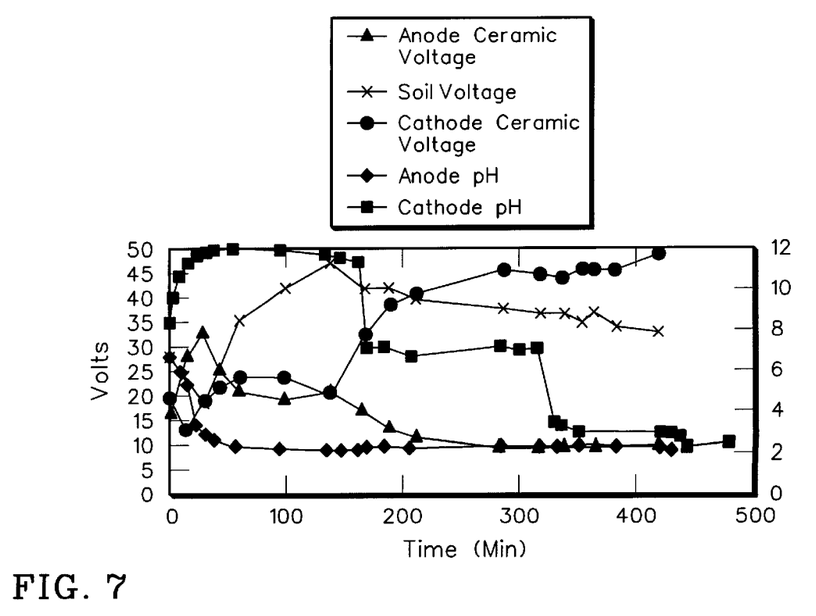
FIG. 7 is a graph of the anode, cathode, and soil voltage as it relates to the pH of the cathode well solution over time.
Figure 8:
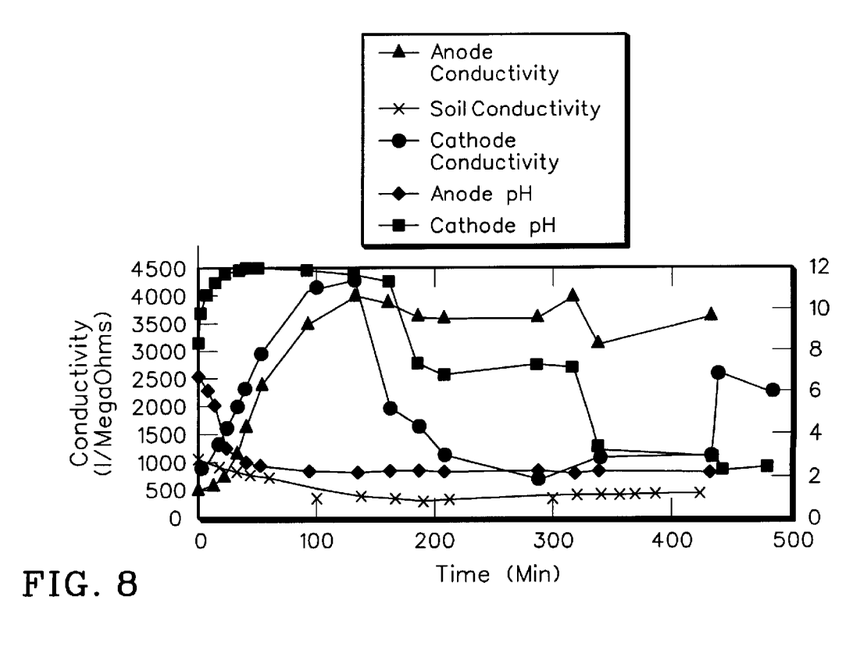
FIG. 8 is a graph of the anode, cathode and soil conductivity as it relates to the pH of the cathode well solution over time.
Figure 8A:
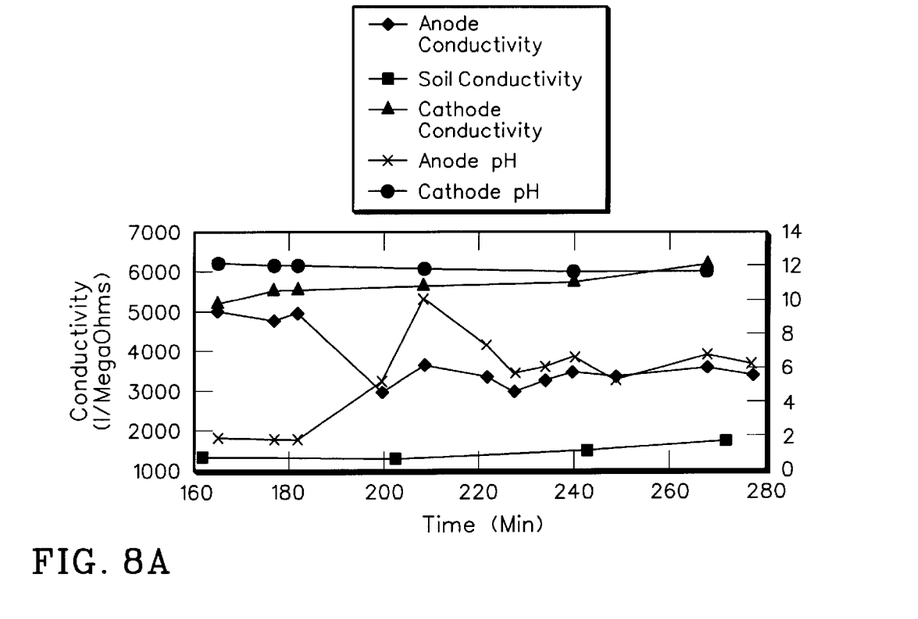
FIG. 8a is a graph of the anode, cathode and soil conductivity as it relates to the pH of the anode well solution over time.

The test results in FIGS. 6–8 show that at the start of the electrokinetic soil processing, the solution in the anode well became acidic and the solution in the cathode well became basic. The electroosmotic flow in the anode well shortly after the start of the process was higher than the electroosmotic flow in the cathode well, reached a maximum at 20 minutes after the start time and then slowed down. At about 100 minutes from the start time, electroosmotic flow rates across the cathode and anode well walls reached equivalent levels. The pH of the cathode well was then changed to lower values by an addition of citric acid to the cathode well. When the pH of the cathode solution was adjusted to neutral, the electroosmotic flow across the cathode ceramic wall increased sharply, while the flow across the anode ceramic wall remained constant. Achieving and/or keeping a neutral pH across the ceramic in the cathode well enhanced the electroosmotic flow rate. This is true because the thickness of an electrochemical double layer formed at the ceramic wall surface expands as the electrolyte becomes less conductive (or less concentrated, assuming hydrogen and hydroxyl ions are the potential determining ions).

The ceramic well wall has micron size pores and is thus suitable for the induction of electrokinetic phenomena in its pores, such as electroosmosis. The electroosmosis in the ceramic pores will depend on the properties of the electrochemical double layer formed between the ceramic pore walls and the pore fluid. The lower the concentration of the ions in the electrochemical double layer (EDL), the deeper the electrochemical double layer will extend into the pore liquid from the ceramic surface, i.e., the thicker the EDL will be. The thicker the EDL the higher is the zeta potential, which represents a portion of the voltage drop across the entire EDL. The ceramic wall has a negative surface charge, similar to soil aluminosilicates, and the electroosmotic flow is induced in a similar manner as in the soil. By adding hydrogen ions, the negative charge on soil will change and can become neutralized, thus decreasing the electroosmotic flow. This will depend on the amount of charge at the pore walls and the type of acid added (strong or weak). If the weaker acid is added, such as citric acid, incomplete dissociation of acid molecules will occur and less charge on soil is neutralized. At the same time, adsorption of acid organic anions will occur which further can impact the charge on soil and zeta potential. In this situation, the zeta potential (driving force for the electrokinetic phenomenon) established between the ceramic surface and the bulk of the pore fluid in the ceramic material increases and causes an increase in the electroosmotic flow. The electroosmotic flow to the cathode well was further increased when the pH was decreased to 2.

The voltage drop across the porous ceramic walls influenced the control of the electroosmotic flow in both the anode and cathode wells. In comparing changes in the anode and cathode electroosmotic flows and the voltage drop across the anode and cathode wells, a remarkable similarity was noted (See FIGS. 6 and 7). The experiments were repeated several times and confirmed a linear relationship between the electroosmotic flow and the voltage across the ceramic well wall. Therefore, control of the voltage on either side of the well wall can be used to enhance the electroosmotic flow through the well wall. A three to four fold increase in the electroosmotic rate across the cathode was obtained by controlling the pH in the well at a pH of about 2. Thus, when a ceramic well wall was used, an efficient electroosmotic suction was achieved in soil having high hydraulic permeability where a low or no electrokinetic transport is expected. Experiments were performed both at constant voltage and at constant current with no significant differences in the results.

Figure 7A:
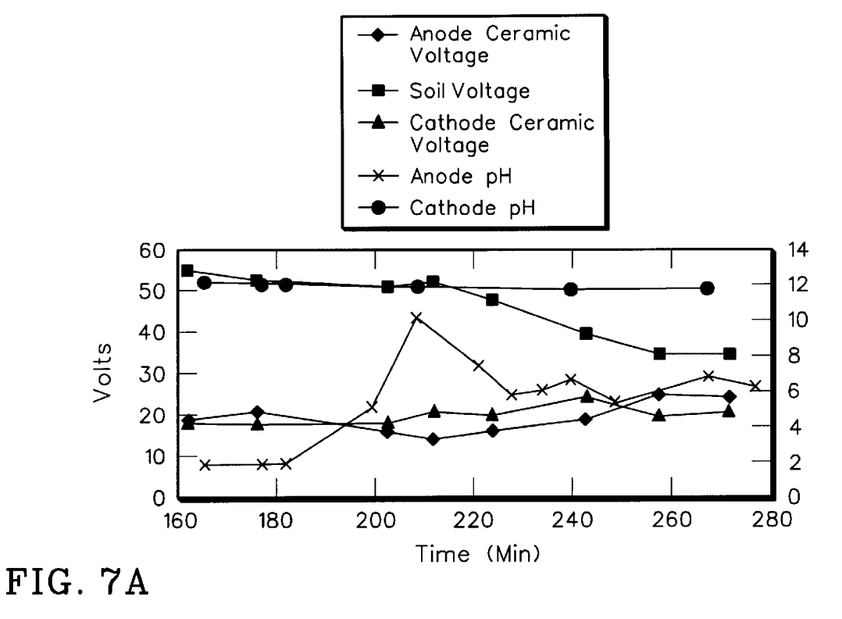
FIG. 7a is a graph of the anode, cathode, and soil voltage as it relates to the pH of the anode well solution over time.

Referring now to FIGS. 6a–8a, control of the electroosmotic flow is achieved across the ceramic anode well wall by adjusting the pH of the anode solution. Equilibrium of the electroosmotic flow had been reached in both wells. The pH of the cathode well solution was not controlled and was allowed to increase to 12. The anode well solution pH was adjusted to neutral (6–8) by the addition of a base such as sodium hydroxide. The electroosmotic flow in the anode well increased with time. The electroosmotic flow changes in both wells are consistent with the changes in the voltage drop across the porous ceramic walls. Changes in the conductivity of the soil or changes in the voltage across the soil did not effect the electroosmotic flow. It is noteworthy that a similar increase in the electroosmotic flow was obtained as a result of similar pH control in the electrode wells where a closed electrode well configuration was used.

Coupled porous structures for electrode wells are particularly useful in sandy soils. It is well known that electrokinetics works well in tightly packed soils with hydraulic permeabilities lower than $10^{-4}$ cm/s. The coupled porous structures described herein extend the application of electrokinetics to soils having high hydraulic permeability and layered soils containing high hydraulic permeability zones. The formation of a low hydraulic permeability and high electroosmotic permeability layer around the wells provides for containment of the well solutions and establishes electroosmotic pumping through sandy soil. Using a coupled porous structure for the cathode wells, such as the one shown in FIGS. 1 and 2, zones of high electroosmotic transport in the vicinity of the cathodes is created. Consequently, the zones of high suction are established in the soil in the vicinity of the captive wells which further enhances water contaminant or reagent transport through the soil. The cathode well with the clay layer under an applied electric field will act as a pumping device in the higher permeability soil such as sandy soil because water tends to move toward zones of lower suction pressure.

One of the porous materials such as the ceramic used for the electrode well walls in the above experiments provides a high throwing power and at the same time an efficient control of the electrokinetic process at the well walls. If the voltage applied across the coupled porous structure was increased to obtain higher voltage in the soil and/or across the ceramic resulting in a higher electroosmotic flow, the current will also increase and may cause the temperature in the well to increase to an unacceptable level. Increased temperature may cause evaporation of the fluid from the wells and loss of well solution which causes a decrease in the surface electrode area covered by the fluid therefore a decrease in the total current. Thus, a suitable current and voltage as well as pH should be utilized across the coupled porous structure to achieve suitable conditions for an efficient electrokinetic remediation process.

The experiments outlined above demonstrated that the electroosmotic flow in various soil types can be independently controlled by using layered porous materials around the electrodes and by adjusting the well solution pH. Well solution pH can be adjusted by addition of buffer solution such as citric acid or sodium hydroxide using a Signet pH controller available from Cole Parmer.

EXAMPLE 5
(hypothetical)

Figure 9:
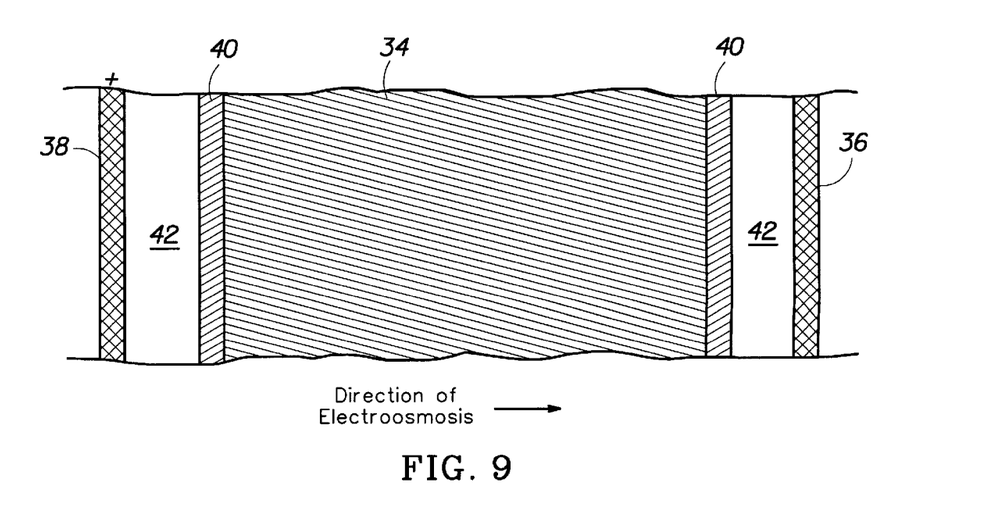
FIG. 9 is a schematic drawing of an electrode well wall design of the present invention.

FIG. 9 shows an example of a soil matrix 34 comprising clay soil with a relatively low hydraulic permeability of less than $10^{-4}$ cm/sec and a high electroosmotic permeability. Above ground electrical and fluid connections are not shown. The cathode 36 has a well wall 40 formed from a layer or layers of high hydraulic permeability materials, such that the low kh high ke soil was coupled to the cathode well walls 40 made of a slotted PVC pipe to provide a low ke, high kh well. The high ke of the clay soil supported electroosmotic flux between the electrodes, thus eliminating the need for a ceramic well wall. Furthermore, the low kh of the soil prevented excessive fluid loss or drainage around the electrodes. The high hydraulic permeability of the PVC well wall 40 did not inhibit the fluid 42 or ion flow around the electrodes. Contaminants, such as cationic metals, accumulated efficiently in the vicinity of the electrodes. The voltage losses around the electrode were low because there was no barrier to ionic flux.

Figure 10:
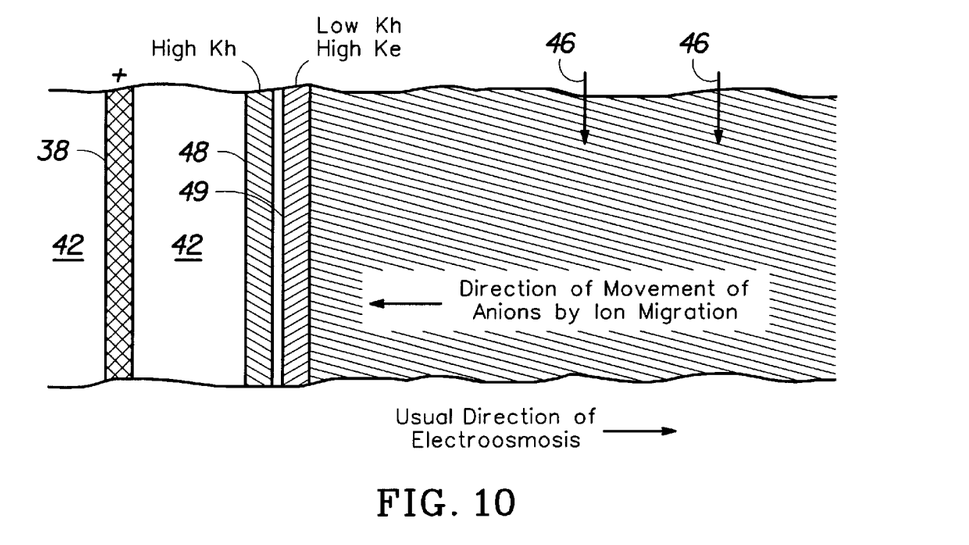
FIG. 10 is a schematic drawing of an electrode well wall design of the present invention.

FIG. 10 illustrates a coupled porous structure that is useful in anion uptake by electromigration. Chemical formulations may be used to reduce the electroosmotic flow at the well wall where it is desirable to achieve high levels of ion uptake by electromigration without losing the contaminants due to fluid movement out of the well. As shown in FIG. 10, a layer 49 surrounding the electrode preferably has a high ke and a low kh which is advantageous and is typically preferred for electroosmosis. The layer 48 has a low ke and high kh which is useful for supporting layer 49. Neutralizing the charge on the soil at the well wall having a low kh and high ke enables contaminants to be carried through the well wall by ion migration and ultimately retained within the well with little chance of downward drainage. However, it should be noted that if the chemical formulation has been effective in reducing the charge on the pores through the well wall, the high ke low kh well wall will be converted to a low ke low kh well wall. The chemical formulation can be introduced into the anode well or directly injected into the soil, preferably, at fluid introduction sites 46. The chemical formulation can be distributed through the soil by electroosmotic flow until the electroosmotic flow has been diminished. The types of chemical formulations that can be added to reduce electroosmotic flow include, a surfactant such as sodium dodecyl sulphate, Tween 80, Vitconol, other environmentally friendly or biodegradable surfactants, or other types of materials having a similar effect on the $\zeta$-potential.

EXAMPLE 6
(hypothetical)

Figure 11:
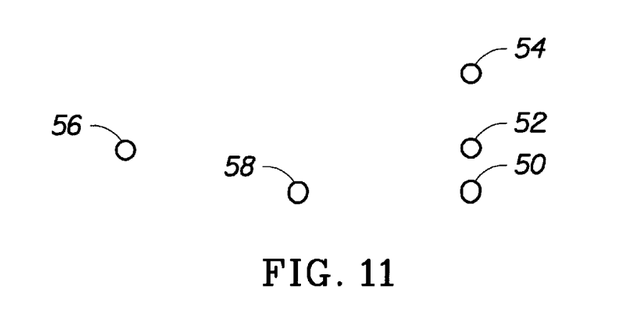
FIG. 11 is a schematic drawing of anodes and cathodes having different well wall constructions positioned in-situ.

FIG. 11 is a schematic diagram of three anodes and two cathodes positioned in situ in a region of sandy soil to determine the most efficient well wall design for removal of anions, such as chromates, from a particular soil region. Chromate anions are removed predominantly by electromigration toward the anodes. Any electroosmosis toward the cathode, either in the well wall or the soil, is undesirable because it will oppose the direction of the electromigration. However, since the soil was sandy the anode wells had to be designed with a low kh (i.e., ceramic and/or kaolinite) in order to retain the solution containing the remediated chromium anions. Furthermore, the return of chromate anions into the soil from the anode by electroosmosis was deterred by adding a sodium dodecyl sulphate surfactant to the anode to reduce the zeta potential of the well wall and perhaps the zeta potential of the soil.

The well walls for anode wells 50, 52, and 54 were made of 4" diameter PVC (polyvinyl chloride) pipe, schedule 40, with horizontal slots (perforations) about 3 mm wide. The anode wells were wrapped with porous polyethylene filter to prevent the soil particles from entering the well. The well surroundings were packed with a mixture of kaolinite (Georgia Kaolinite, RC 32, Crozier-Nelson, Houston, Tex.) and sand (about 1–2 mm diameter silica sand). The anode wells 52 and 54 were packed with a mixture of 20 weight percent (wt %) kaolinite and 80 wt % sand. The anode well 50 had a double wall structure consisting of two perforated PVC pipes about one inch apart and packed with a mixture of 20 wt % kaolinite and 80 wt % sand pre-acidified with hydrochloric acid from an initial pH of about 7.5–8.0 to yield a soil pH of about 2.

The cathode wells 56 and 58 were made from a 3.75" diameter porous ceramic pipe (Ferro Corp., East Rochester, N.Y.). The ceramic casing is made of a high alumina ceramic material formulated to provide closely controlled pore size, with high flexural strength, low electrical resistivity and low hydraulic permeability for inducing electroosmotic flow across the well wall. The preferred ceramic material, formed by a casting method, has wall thickness of about 0.4 inches, 35% (volume) porosity, 0.2–0.5 microns pore size, bulk density of 0.083 $lb/in^3$ and specific resistivity (approximately 40 ohms per $cm^2$ per mm thickness (in 0.1 N KCl)). The area around cathode wells 56 and 58 was packed (during coring) with a mixture of 20% kaolinite and 80% sand. Both anode and cathode wells were closed off on the bottom. Metal electrodes were positioned in the anode and cathode wells filled with the soil pore fluid to provide a connection to a DC power supply.

Current was applied to the wells and electroosmotic flow, pH and voltage measurements were taken to determine which well wall material provided the most efficient remediation for that particular soil region. The soil was highly conductive and therefore supported electroosmosis. The anode well with the perforated PVC casing and polyethylene filt well wall layers combined with the ceramic, clay/sand cathode well walls provided the greatest electroosmotic flow through the soil.

Pre-acidified packing around the cathode well may decrease the amount of acid required to maintain the pH of the cathode solution at a pre-determined level, or replace the acid addition to the cathode if the acidified packing is thick enough. The acidified packing consisted of kaolin/sand mixture (80/20) acidified with hydrochloric acid to the mixture pH of 2. The layer was about 1.5 inches thick and was packed between 4 inches inner perforated PVC well casing and an outer about 6 inches diameter perforated PVC casing (or tube).

While the foregoing is directed to the preferred embodiment of the present invention, other and further embodiments of the invention may be devised without departing from the basic scope thereof, and the scope thereof is determined by the claims which follow.

What is claimed is:

1. An apparatus for electrokinetic transport through soil, comprising:
   (a) an electrode;
   (b) a containment surrounding the electrode, the containment comprising a layer of a first porous material having an electroosmotic permeability coefficient greater than about $10^{-6}$ and a hydraulic permeability coefficient less than about $10^{-3}$ and a rigid porous member disposed between the electrode and the first porous material to secure the first porous material, wherein the first porous material and the rigid porous member allow passage of water, hydrogen ions, hydroxyl ions and one or more target ions; and
   (c) a voltage probe positioned inside the rigid porous member and a voltage probe positioned outside the first porous material to measure the voltage drop across the containment.

2. The apparatus of claim 1, wherein the porous material is clay.

3. The apparatus of claim 2, wherein the rigid member has holes with a diameter between about 0.7 centimeter and about 1 centimeter formed therethrough.

4. The apparatus of claim 3, further comprising a filter covering the holes in the rigid structure.

5. The apparatus of claim 2, further comprising a second rigid porous member surrounding the first porous material.

6. The apparatus of claim 1, wherein the rigid member has an electroosmotic permeability coefficient less than about $10^{-3}$ and a hydraulic permeability coefficient greater than about $10^{-6}$.

* * * * *